United States Patent [19]

Aron

[11] Patent Number: 4,875,332
[45] Date of Patent: Oct. 24, 1989

[54] HAY MAKING MACHINE

[75] Inventor: Jerome Aron, Bouxwiller, France

[73] Assignee: Kuhn, S.A., Saverne Cedex, France

[21] Appl. No.: 175,222

[22] Filed: Mar. 30, 1988

[30] Foreign Application Priority Data

Apr. 1, 1987 [FR] France .................. 87 04672

[51] Int. Cl.$^4$ .......................... A01D 78/12
[52] U.S. Cl. ............................ 56/377
[58] Field of Search ................... 56/370, 377

[56] References Cited

U.S. PATENT DOCUMENTS

| 3,664,105 | 5/1972 | Stiefvater et al. | 56/370 |
| 3,896,613 | 7/1975 | van der Lisly | 56/377 |
| 4,105,412 | 4/1977 | Reber | 56/370 |
| 4,194,348 | 3/1980 | Gerlinger | 56/377 |
| 4,245,457 | 1/1981 | Gerlinger | 56/270 |
| 4,275,551 | 6/1931 | van der Lisly | 56/370 |
| 4,281,506 | 8/1981 | Wattoron | 56/370 |

FOREIGN PATENT DOCUMENTS

| 2057370 | 11/1971 | Fed. Rep. of Germany . |
| 2918211 | 11/1980 | Fed. Rep. of Germany . |
| 3107162 | 9/1982 | Fed. Rep. of Germany | 56/370 |
| 535001 | 5/1973 | Switzerland . |
| 2069809 | 9/1981 | United Kingdom | 56/370 |

Primary Examiner—Paul J. Hirsch
Attorney, Agent, or Firm—Oblon, Spivak, McClelland, Maier & Neustadt

[57] ABSTRACT

The outside part 17 of each tool-carrying arm 10 is offset in relation to the inside part 18 is that the center of gravity G of the set comprising the outside part 17 and the associated work tools 11 is located at least approximately on the longitudinal axis of rotation 16.

7 Claims, 2 Drawing Sheets

HAY MAKING MACHINE

FIELD OF THE INVENTION:

This invention relates to a hay making machine intended particularly for windrowing of hay and comprising at least one raker wheel driven in rotation during work. The raker wheel is equipped with tool-carrying arms operated so that, at each revolution, they rotate around their respective longitudinal axes to remove the raked hay.

BACKGROUND OF THE INVENTION:

On a known machine of this type, the tool-carrying arms are almost rectilinear and comprise work tools near their outside ends. The work tools generally appear in the form of forks provided with coils to increase their flexibility. The forks are all located on the same side in relation to the longitudinal axes of rotation of their support arms. Consequently, there are considerable imbalances at the level of the support arms when they rotate around their axes during work. These imbalances cause vibrations of the machine and a rapid wear of the bearings guiding the tool-carrying arms and of the mechanisms which control their rotation.

OBJECT OF THE INVENTION

This invention has as its object to improve the arrangement of the carrier arms and the work tools, to increase the reliability of the machines, and to obtain a better operation.

SUMMARY OF THE INVENTION

An important characteristic of the invention consist in that at least the outside part of each arm, to which the work tools are fastened, is offset in relation to the inside part of the same arm so that the center of gravity of each unit including the outside part and the associated work tools are located at least approximately on the axis of rotation of the corresponding tool-carrying arm. Thanks to this arrangement, all of the parts which rotate around the longitudinal axes of the tool-carrying arms are balanced. Because of this, the operation of the machine according to the invention is much smoother than the operation of the prior-art machine, and the wear of the bearings of the tool-carrying arms and of the control mechanism of the latter is clearly less rapid than is the case with the prior-art machines.

Other characteristics and advantages of the invention will become apparent from the following description with reference to the accompanying drawings, which represent, by way of a nonlimiting example, an embodiment of the invention.

DETAILED DESCRIPTION OF THE PRESENTLY PREFERRED EMBODIMENT

Figure 1:
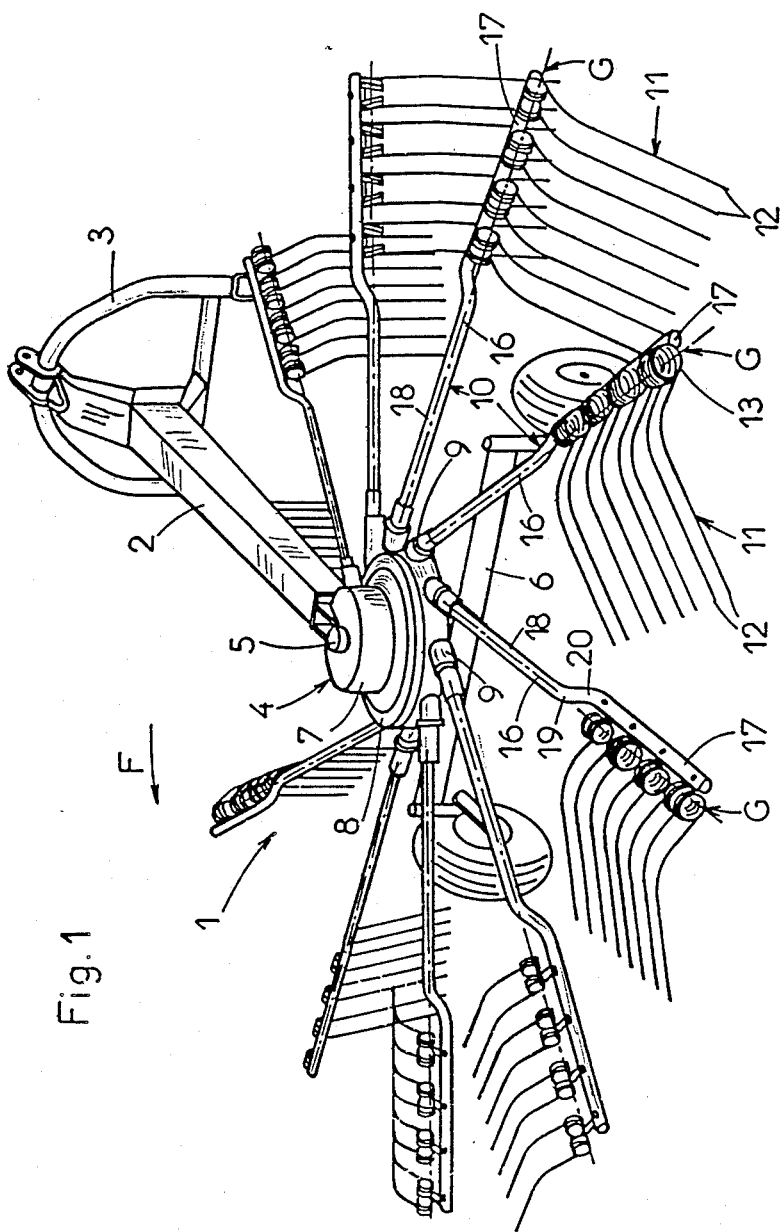
FIG. 1 is an overall view of the machine according to the invention.

As is represented in FIG. 1, the machine according to the invention comprises a raker wheel 1 connected to the rear end of a carrier beam 2. The front end of the carrier beam 2 carries a three-point hitching frame 3 for coupling to a drive tractor (not shown). The raker wheel 1 has a central casing 4 or the like through which an at least approximately vertical carrier pin 5 passes. The lower end of the carrier pin 5 is connected to a set of wheels 6 making it possible for the machine to move over the ground during work.

The central casing 4 consists of a stationary upper part 7 which is connected to the carrier pin 5 and to the carrier beam 2 and of a mobile lower part 8. The mobile lower part 8 can move in rotation around the carrier pin 5. During work, the mobile lower part 8 is driven in rotation in the direction of an arrow F from the power take-off shaft of the tractor. For this purpose, the power take-off shaft is connected by a transmission shaft to a drive shaft housed in the stationary upper part 7 of the central casing 4. Inside the stationary upper part 7, the drive shaft comprises a pinion gear which meshes with a ring gear that is solid with the mobile lower part 8 of the central casing 4.

The mobile lower part 8 of the central casing 4 carries several bearings 9 in which tool-carrying arms 10 are guided. The tool-carrying arms 10 can be made of one or more parts. They extend in the shape of spokes toward the outside of the central casing 4 and comprise work tools 11 near their outside ends. In the example shown, the work tools 11 consist of raking forks 12 each comprising two wires provided with coils 13 and a central loop 14 for the fastening of the raking forks 12 to the tool-carrying arms 10. The fastening is assured by bolts 15 which go into the central loop 14 and go through the tool-carrying arms 10 (see FIG. 2). Each tool-carrying arm 10 advantageously comprises four raking forks 12 placed side-by-side. This arrangement of the raking forks 12 makes is possible to replace any of them, for example, in case of breaking of one of the wires, without it being necessary to remove the neighboring raking fork or forks 12.

The inside end of each tool-carrying arm 10 penetrates into the mobile lower part 8 of the central casing 4. On the inside of the central casing 4 it comprises, in a way known in the art, a crank provided with a roller which moves in a control cam that is immobile during work. The control cam is fastened to the carrier pin 5 of the raker wheel 1. It comprises a stepped portion so that the rollers move in height over a part of their path. During this movement, the rollers actuate the tool-carrying arms 10 by the cranks.

The tool-carrying arms 10 are thus operated during work so that they rotate at each revolution around their respective longitudinal axes of rotation 16. This causes the work tools 11 to go from an at least approximately vertical position to an at least approximately horizontal position and vice versa. In the at least approximately vertical position, the work tools 11 gather and laterally move the hay that is on the ground. As soon as they rotate upward into the at least approximately horizontal position, they release the gathered hay and deposit it in the form of a windrow.

According to the invention, an outside part 17 of each tool-carrying arm 10 to which the work tools 11 are fastened is offset in relation to an inside part 18 of the same arm so that the center of gravity G of each set comprising the outside part 17 and the work tools 11 is located at least approximately on the longitudinal axis of rotation 16 of the corresponding tool-carrying arm 10. The parts moving around the longitudinal axis of rotation 16 are also balanced. Consequently, there are no shocks at each rotation on the bearings 9 and the control means for the tool-carrying arms 10.

Figure 2:
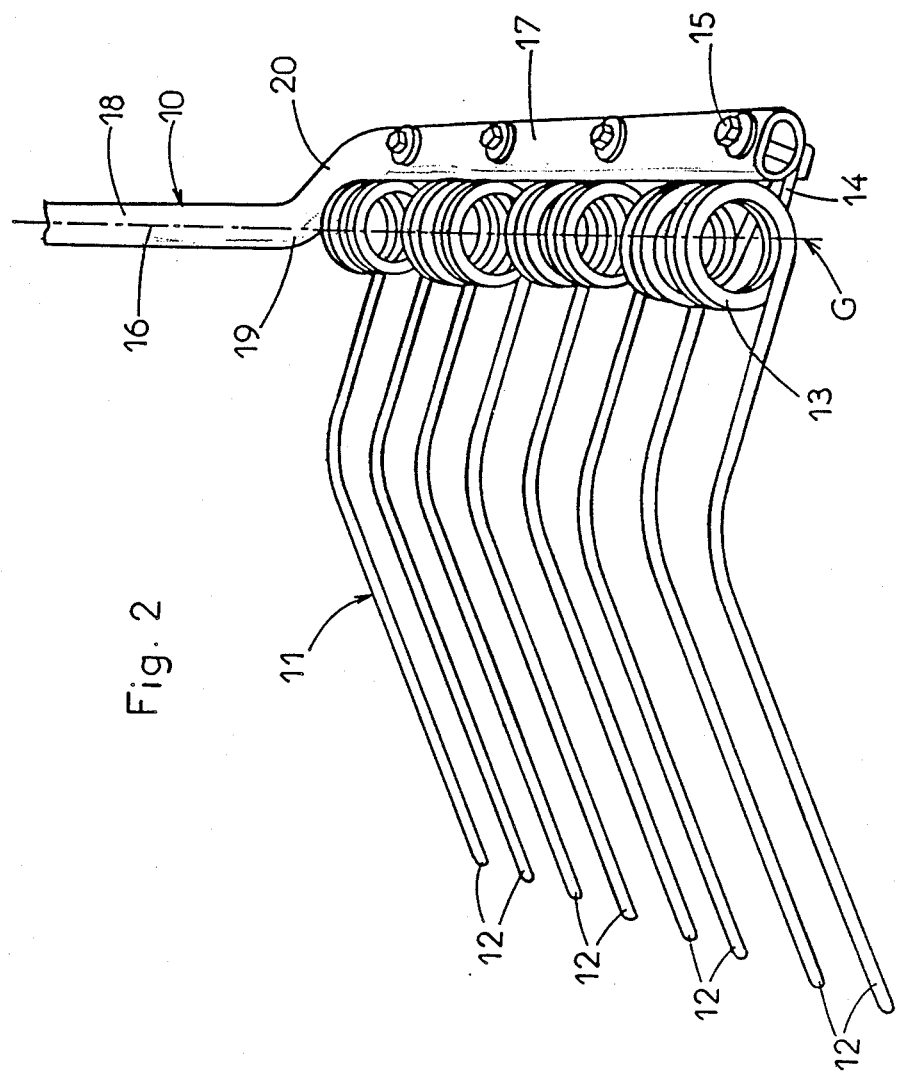
FIG. 2 is a detail view of a tool-carrying arm on a larger scale.

It is apparent particularly from FIG. 2 that the outside part 17 of each tool-carrying arm 10 is offset in relation to the longitudinal axis of rotation 16 toward the side opposite the one on which the major portions of the work tools 11 are located. This arrangement makes it possible to bring the work tools 11 close to the longitudinal axis of rotation 16 and to balance the weight of the work tools 11 in part at least by means of the tool-carrying arms 10 themselves.

This offsetting can be performed as shown, by providing on each tool-carrying arm 10 two bends 19 and 20 located one after the other and directed in opposite directions. This offsetting can also be obtained by making each tool-carrying arm 10 in two separate parts which are offset in relation to one another and connected to one another by a crosspiece.

The two parts 17 and 18 of each tool-carrying arm 10 are at least approximately parallel to one another. This characteristic makes it possible to control well the position of the work tools 11 both in the raking zone and during their rotation for releasing the hay and forming the windrow.

It is quite obvious that other improvements, modifications, or additions can be made to the disclosed embodiment and that certain elements can be replaced by equivalent elements without thereby going outside the scope of the invention.

What is Claimed as New and Desired to be Secured by Letters Patent of the United States is:

1. A hay making machine comprising a beam carrying at least one raker wheel having:
   (a) a central causing comprising a stationary upper part and a mobile lower part;
   (b) a plurality of tool-carrying arms projecting from said mobile part in an at least approximately horizontal array, each one of said plurality of tool-carrying arms comprising an inside part having a longitudinal axis of rotation and an outside part; and
   (c) at least one work tool mounted on said outside part of each one of said plurality of tool-carrying arms,
   (d) wherein said outside part of each one of said plurality of tool-carrying arms is offset in relation to the longitudinal axis of rotation of the corresponding inside part of said each one of said plurality of tool-carrying arms towards the side opposite the one on which said work tools are located, so that the center of gravity of each set comprising one of said outside parts and the associated at least one work tool is located at least approximately on the longitudinal axis of rotation of the inside part of said each one of said plurality of tool-carrying arms.

2. A hay making machine according to claim 1 wherein each one of said tool-carrying arms comprises between the inside part and the outside part two bends which are located one after the other and which are directed in opposite directions.

3. A hay making machine according to claim 1 wherein the inside part and the outside part of each tool-carrying arm are two separate parts which are offset in relation to one another and which are connected to one another by means of a crosspiece.

4. A hay making machine according to claim 1 wherein the inside part and the outside part of each one of said tool-carrying arms are at least approximately parallel to one another.

5. A hay making machine comprising:
   (a) a carrier beam having a front end and a rear end;
   (b) a three-point hitching frame carried by the front end of said carrier beam;
   (c) a central casing comprising:
      (i) an upper part that is connected to the rear end of said carrier beam and that is stationary relative to said carrier beam and
      (ii) a lower part that is rotatable relative to said upper part about an axis that, in use, is at least approximately vertical;
   (d) first mans for supporting said central casing so that it can be pulled over the ground;
   (e) second means for rotating said lower part relative to said upper part;
   (f) a plurality of bearings carried at least approximately horizontally in said lower part;
   (g) a plurality of arms, each one of said plurality of arms;
      (i) comprising an inner part that is straight, that has a longitudinal axis, and that is mounted for rotation about its longitudinal axis in a corresponding one of said plurality of bearings and an outer part that is straight and that is at least approximately parallel to but offset from said inner part and
      (ii) having a raking fork that projects from said outer part of least approximately perpendicularly thereto; and
   (h) third means for rotating said plurality of arms in said plurality of bearings so that each arm rotates back and forth between a first position in which its raking fork is in an at least approximately vertical position in which it gathers and laterally moves hay to a second position in which its raking fork is in an at least approximately horizontal position in which it releases the gathered hay and deposits it in the form of a windrow,
   (i) wherein said arm and said raking forks are sized, shaped, and positioned so that the center of gravity of each set comprising said outer part and the associated one of said raking forks is located at least approximately on the longitudinal axis of the corresponding one of said inner parts.

6. A hay making machine according to claim 1 herein the inside and outside parts of each one of said tool-carrying arms are formed from a single continuous piece.

7. A hay making machine according to claim 5 wherein the inner part and the outer part of each one of said arms are formed from a single continuous piece.

* * * * *

UNITED STATES PATENT AND TRADEMARK OFFICE
CERTIFICATE OF CORRECTION

PATENT NO. : 4,875,332
DATED : OCTOBER 24, 1989
INVENTOR(S) : JEROME ARON

It is certified that error appears in the above-identified patent and that said Letters Patent is hereby corrected as shown below:

On the title Page:

In references cited, delete "van der Lisly" and insert --van der Lely--;

In references cited, delete "4,105,412" and insert --4,015,412--;

In references cited, delete "Gerlinger.....56/270" and insert --Gerlinger.....56/370--;

In references cited, delete "Wattoron" and insert --Wattron--;

In the abstract, line 2, delete "is" and insert --so--;

In column 3, line 32, delete "causing" and insert --casing--.

Signed and Sealed this

Eighteenth Day of December, 1990

Attest:

HARRY F. MANBECK, JR.

*Attesting Officer*     *Commissioner of Patents and Trademarks*